US009912877B2

(12) United States Patent
Abe

(10) Patent No.: US 9,912,877 B2
(45) Date of Patent: Mar. 6, 2018

(54) IMAGING APPARATUS FOR CONTINUOUSLY SHOOTING PLURAL IMAGES TO GENERATE A STILL IMAGE

(71) Applicant: Panasonic Intellectual Property Management Co., Ltd., Osaka (JP)

(72) Inventor: Mitsuo Abe, Osaka (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

(21) Appl. No.: 15/284,787

(22) Filed: Oct. 4, 2016

(65) Prior Publication Data
US 2017/0244883 A1    Aug. 24, 2017

(30) Foreign Application Priority Data
Feb. 22, 2016    (JP) .................................. 2016-030634

(51) Int. Cl.
  *H04N 5/235*    (2006.01)
  *H04N 5/232*    (2006.01)

(52) U.S. Cl.
  CPC ....... *H04N 5/2356* (2013.01); *H04N 5/23212* (2013.01); *H04N 5/23293* (2013.01)

(58) Field of Classification Search
  CPC ............. H04N 5/2356; H04N 5/23212; H04N 5/23293

USPC ....................................................... 348/222.1
See application file for complete search history.

(56) References Cited

U.S. PATENT DOCUMENTS

2015/0271475 A1*    9/2015    Shibuno ............. H04N 5/23212
                                                            348/46

FOREIGN PATENT DOCUMENTS

JP            2004-135029            4/2004

* cited by examiner

*Primary Examiner* — Lin Ye
*Assistant Examiner* — Chan Nguyen
(74) *Attorney, Agent, or Firm* — Wenderoth, Lind & Ponack, L.L.P.

(57) ABSTRACT

An imaging apparatus performs search processing for shooting frame images while moving the focus lens and obtaining a frame image which is focused on each AF area, performs moving image shooting processing for recording a moving image while moving the focus lens after ending the search processing, and performs still image generation processing for generating a still image from among a plurality of frame images composing the recorded moving image data, by referring to a result of the search processing after the moving image shooting processing. When a user performs an operation of changing a focus position on a subject during a period from an end of the search processing to an end of the moving-image shooting processing, the imaging apparatus displays a message that calls user's attention on the display unit.

8 Claims, 13 Drawing Sheets

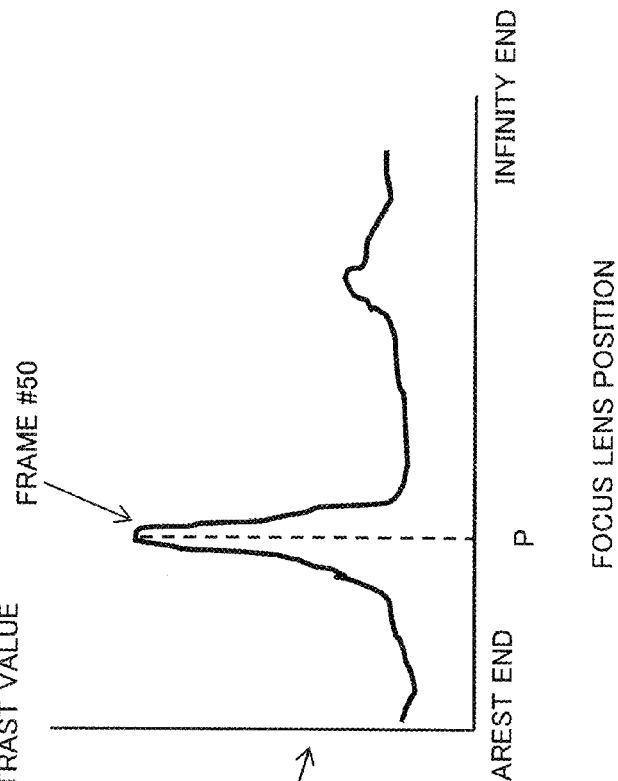
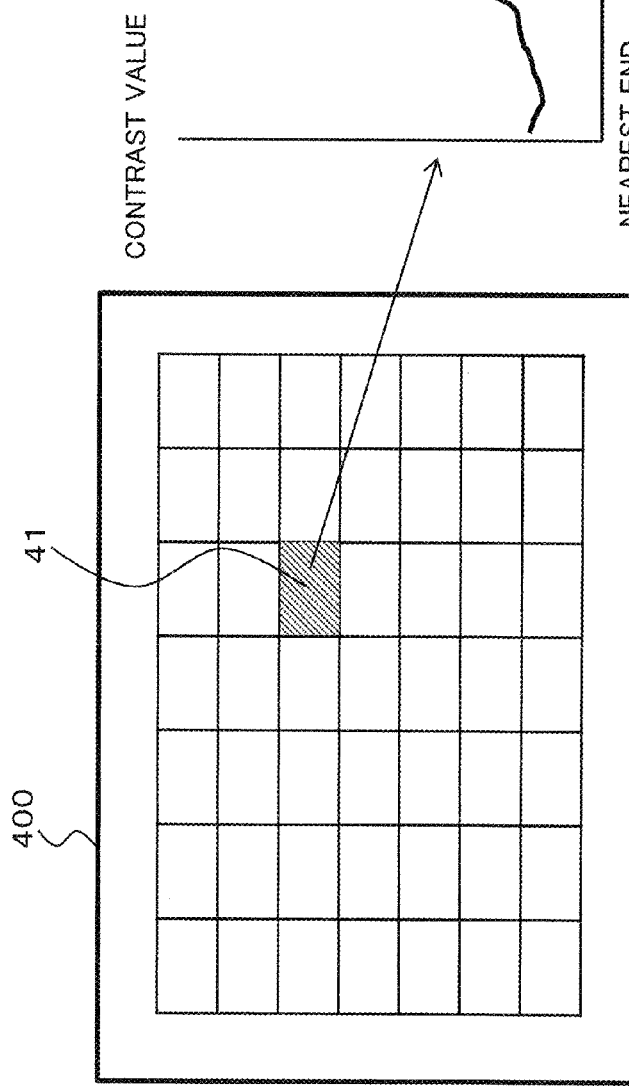

Fig. 6A

FOCUS INFORMATION TABLE

↙ 60

| | FOCUS LENS POSITION (CLOSEST TO NEAREST END) (Pnear) | FOCUS LENS POSITION (CLOSEST TO INFINITY END) (Pfar) |
|---|---|---|
| a | 10 | 200 |

| | | 1ST AF AREA | 2ND AF AREA | 3RD AF AREA | ... | 19TH AF AREA | ... | 49TH AF AREA |
|---|---|---|---|---|---|---|---|---|
| b | FRAME NUMBER | 5 | 43 | 36 | ... | 50 | ... | 100 |
| c | FOCUS LENS POSITION (FOCUS POSITION) | 10 | 100 | 75 | ... | P | ... | 200 |

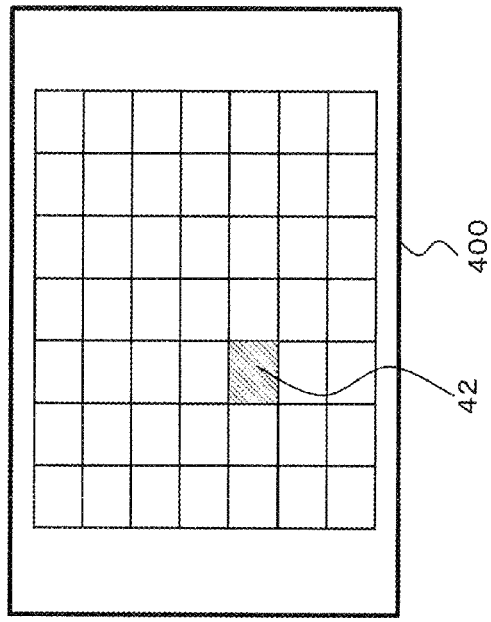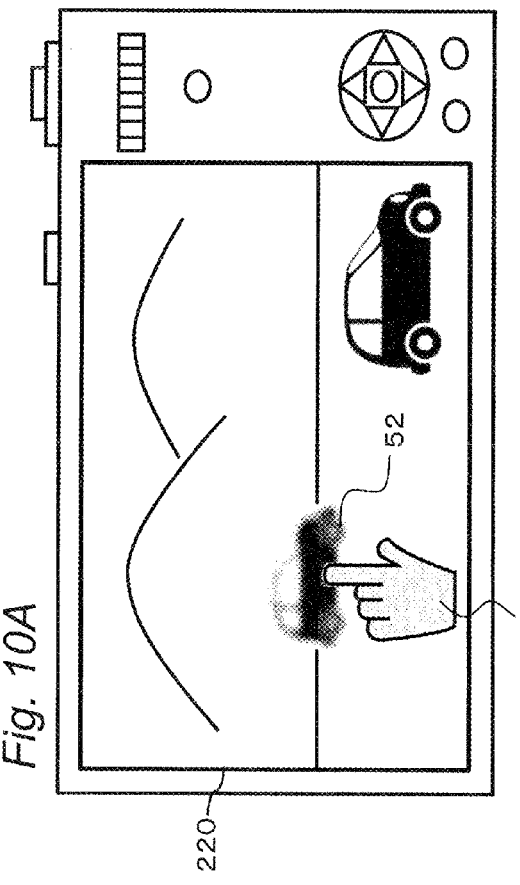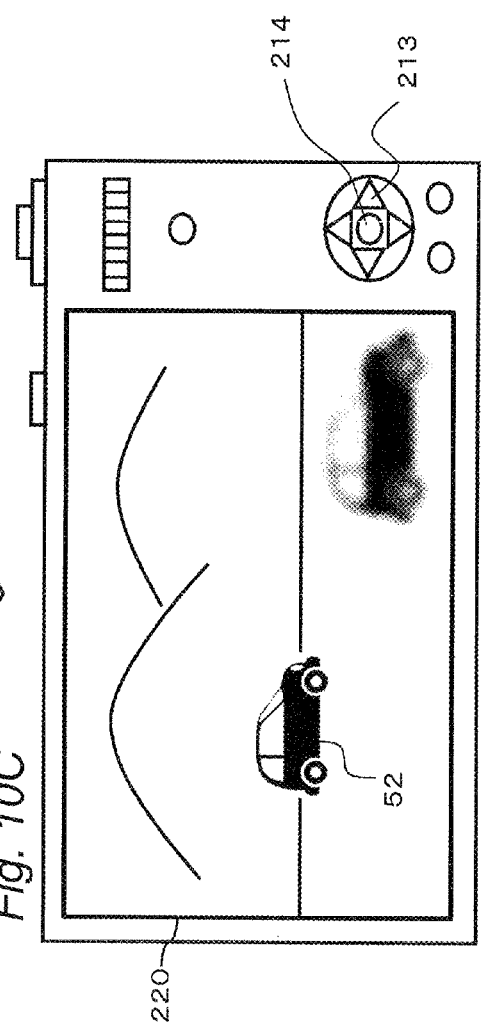

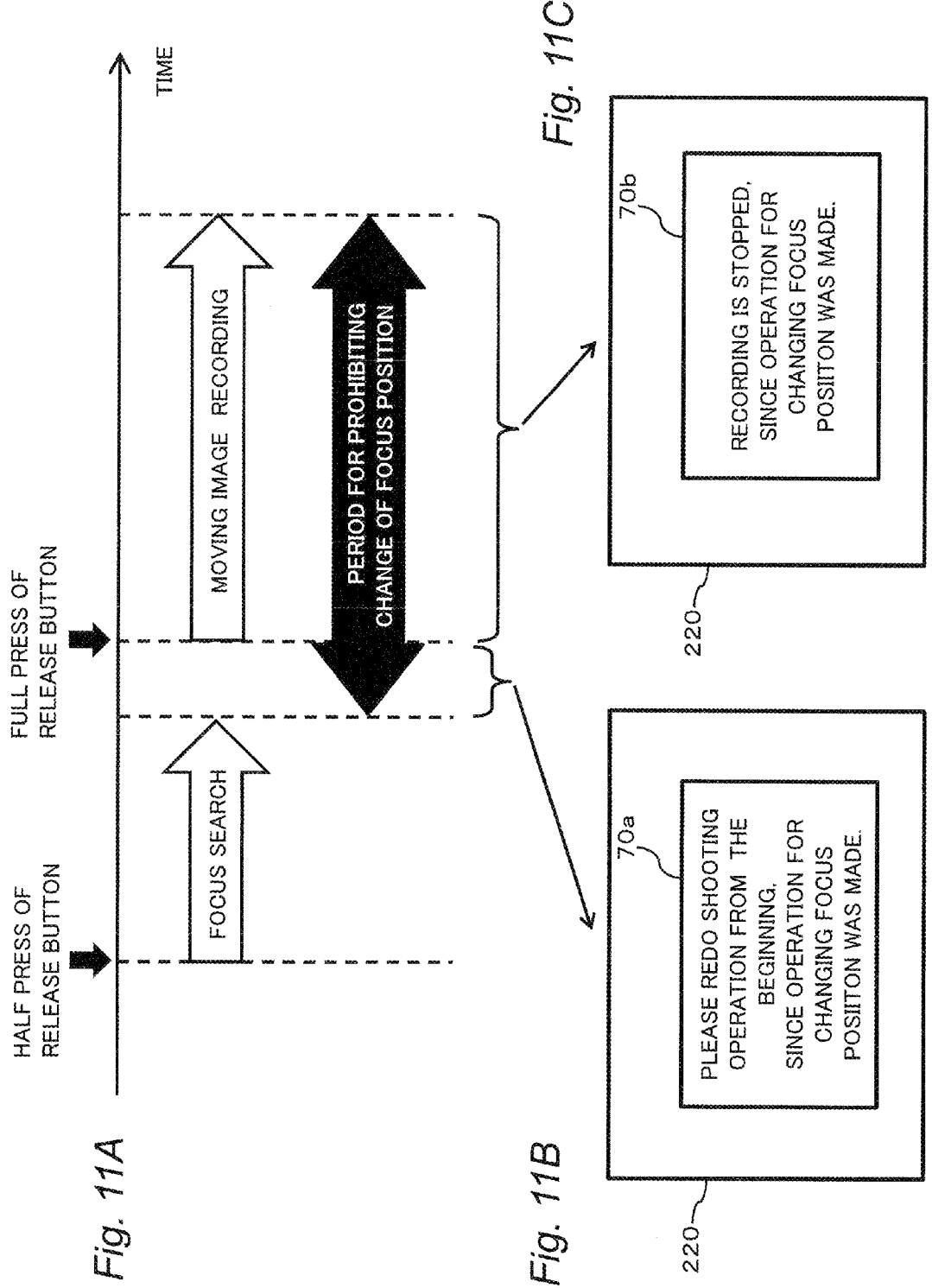

IMAGING APPARATUS FOR CONTINUOUSLY SHOOTING PLURAL IMAGES TO GENERATE A STILL IMAGE

BACKGROUND

1. Technical Field

The present disclosure relates to an imaging apparatus that continuously shoots a plurality of images while changing a focus distance and generates one still image from among the plurality of shot images.

2. Related Art

Among functions of a digital camera, there is a focus bracket function for carrying out continuous shooting while moving a focal position (a focus distance). According to this function, a user can select an image of a desired focus state (a focus distance) after image shooting.

Unexamined Japanese Patent Publication No. 2004-135029 discloses a digital camera having a focus bracket function. This digital camera has a calculating unit that calculates a focus evaluation value which expresses a focus state of each of a plurality of images continuously shot by shooting according to a focus bracket function, and a control unit that selects an image having a good in-focus state based on the focus evaluation value of each of the plurality of images calculated by the calculating unit, and controls an operation of a recording unit so as to record, onto a recording medium, image data representing the selected image. This function makes it possible to select and record an image having a good in-focus state from among the plurality of shot images.

SUMMARY

The present disclosure provides an imaging apparatus having a function that continuously shoots a plurality of images while changing a focus distance and generates one still image from among the plurality of shot images.

According to one aspect of the present disclosure, an imaging apparatus is provided, which continuously shoots a plurality of images while changing a focus distance and generates one still image from among the plurality of shot images.

The imaging apparatus includes an optical system including a focus lens, an operating unit configured to receive a user operation, an imaging unit configured to generate an image signal from optical information which is input via the optical system, an image processor configured to perform predetermined processing to the image signal generated by the imaging unit to generate image data, a display unit configured to display predetermined information, and a control unit configured to control the imaging unit and/or the image processor.

A plurality of AF areas are set in a region of an image indicated by the image data. The control unit performs search processing for shooting frame images while moving the focus lens and obtaining a frame image which is focused on each AF area, performs, after ending the search processing, moving image shooting processing for recording a moving image while moving the focus lens, and performs, after the moving image shooting processing, still image generation processing for generating a still image from among a plurality of frame images composing the recorded moving image data, by referring to a result of the search processing. When a user performs an operation of changing a focus position on a subject during a period from an end of the search processing to an end of the moving-image shooting processing, the control unit displays a message that calls user's attention on the display unit.

When the user changes an angle of view or the like after search processing, the imaging apparatus according to the present disclosure displays a message that calls user's attention. Accordingly, the user can recognize that a desired function is not realized, and can take measure to realize the desired function.

BRIEF DESCRIPTION OF DRAWINGS

FIG. 5A is an explanatory view of an AF area that is set in an image area;

FIG. 5B is an explanatory view of a change in a contrast value in one AF area;

FIG. 6A is a diagram showing an example of a focus information table;

FIGS. 10A to 10C are explanatory views of operations by the user of assigning a desired focus area;

FIG. 11A is an explanatory view of a focus-position-change prohibiting period, and FIGS. 11B and 11C are views showing display examples of messages.

DETAILED DESCRIPTION OF PREFERRED EMBODIMENT

Figure 1:
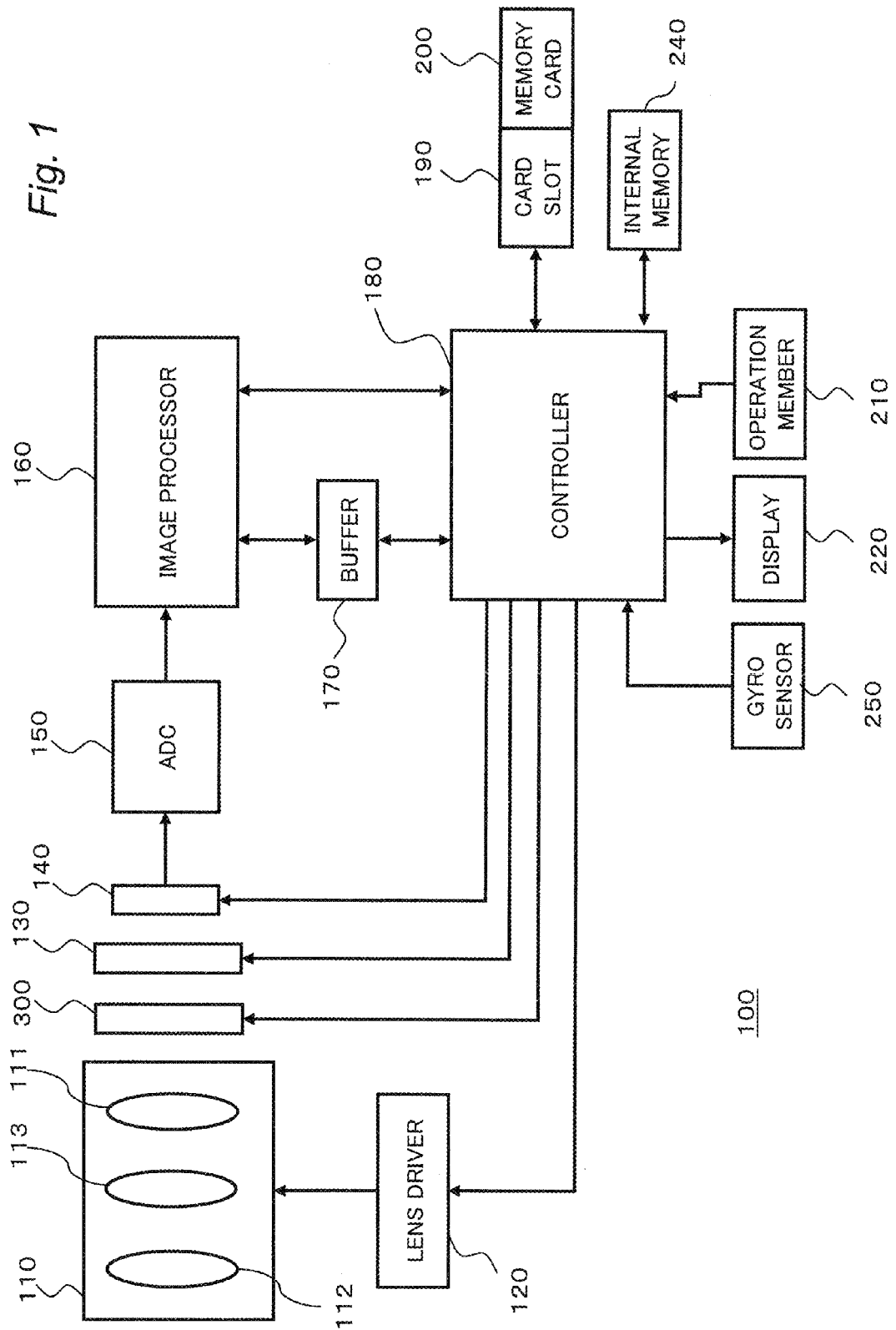
FIG. 1 is a diagram showing a configuration of a digital camera according to the present disclosure.

Hereinafter, a preferred embodiment will be described in detail by appropriately referring to the drawings. However, a more than necessary detailed description will be omitted in some cases. For example, a detailed description of an already-known item and a duplicate description of substantially identical configurations will be omitted in some cases. This is for the purpose of facilitating the understanding of those skilled in the art concerned, by avoiding the following description becoming unnecessarily redundant. The present inventors provide the appended drawings and the following description for those skilled in the art concerned to sufficiently understand the present disclosure, and will not intend to limit, by the provision, the subject of the description in claims.

Hereinafter, an imaging apparatus according to an embodiment of the present disclosure will be described with reference to the drawings.

First Embodiment

1. Configuration of Digital Camera

An electrical configuration of a digital camera according to a first embodiment will be described with reference to FIG. 1. FIG. 1 is a block diagram showing a configuration of a digital camera 100. The digital camera 100 is an imaging apparatus that captures, with a CCD 140, a subject image formed by an optical system 110 composed of one or a plurality of lenses. The image data generated by the CCD 140 is processed by an image processor 160 and stored in a memory card 200. A configuration of the digital camera 100 will be described below in detail.

The optical system 110 includes a focus lens 111 and a zoom lens 112. A subject image can be zoomed in or zoomed out by moving the zoom lens 112 along an optical axis. A focus (a focus state) of the subject image can be regulated by moving the focus lens 111 along the optical axis. The optical system 110 also includes an image stabilizer lens for reducing image blur caused by hand vibration on the digital camera 100.

A lens driver 120 drives various kinds of lenses included in the optical system 110. The lens driver 120 includes, for example, a zoom motor for driving the zoom lens 112 and a focus motor for driving the focus lens 111.

A diaphragm 300 regulates a size of an opening according to user's setting or automatically to adjust a quantity of light transmitting through the opening.

A shutter 130 is a unit that blocks light transmitting to the CCD 140. The shutter 130 together with the optical system 110 and the diaphragm 300 controls optical information indicating a subject image. Further, the optical system 110 and the diaphragm 300 are housed in a lens barrel (not shown).

The CCD 140 captures a subject image formed by the optical system 110 to generate image data. The CCD 140 includes a color filter, a light-receiving element, and an AGC (Auto Gain Controller). The light-receiving element converts an optical signal collected by the optical system 110 into an electric signal to generate image information. An AGC amplifies the electric signal output from the light-receiving element. The CCD 140 further includes drive circuits for carrying out exposure, transfer, and various kinds of operations of an electronic shutter and the like.

An ADC (A/D(analog/digital) converter) 150 converts analog image data generated by the CCD 140 to digital image data.

The image processor 160 performs various kinds of processing to digital image data generated by the CCD 140 and converted by the ADC 150, under control of a controller 180. The image processor 160 generates image data for displaying on a display monitor 220, and also generates image data to be stored in the memory card 200. For example, the image processor 160 performs various kinds of processing such as gamma correction, white balance correction, and flaw correction, to the image data generated by the CCD 140. Further, the image processor 160 compresses the image data generated by the CCD 140 according to a compression format based on H.264 standard or MPEG2 standard. The image processor 160 can be realized by a DSP (Digital Signal Processor) or a microcomputer. Further, the image processor 160 can generate image data (4k moving image data) of a moving image of a pixel number around 4000×2000, based on the image data generated by the CCD 140. The image processor 160 can perform various kinds of processing described later to the generated 4k moving image data.

The controller 180 is a control unit that controls the entire digital camera 100. The controller 180 can be realized by a semiconductor element or the like. The controller 180 may be configured by only hardware, or combination of hardware and software. That is, the controller 180 can be realized by microcomputer, CPU, MPU, DSP, ASIC, FPGA, or the like.

A buffer 170 functions as a work memory for the image processor 160 and for the controller 180. The buffer 170 can be realized by, for example, a DRAM (Dynamic Random Access Memory), a ferroelectric memory, or the like.

A card slot 190 is a unit for attaching the memory card 200 to the digital camera 100. The card slot 190 can mechanically and electrically connect the memory card 200 to the digital camera 100.

The memory card 200 internally includes a flash memory, a ferroelectric memory, and the like, and can store data such as an image file generated by the image processor 160.

A internal memory 240 is configured by a flash memory, a ferroelectric memory, or the like. The internal memory 240 stores a control program for controlling the entire digital camera 100, and data.

An operation member 210 is a collective term of a user interface that receives an operation by the user. The operation member 210 includes a button, a lever, a dial, a touch panel, and a switch that receives user's operation. Further, the operation member 210 includes a focus ring provided on an outer periphery of the lens barrel. The focus ring is a member that is rotated by the user to move the focus lens 111.

The display monitor 220 can display an image (a through image) represented by the image data generated by the CCD 140, and an image represented by the image data read from the memory card 200. Further, the display monitor 220 can also display various kinds of menu screens for carrying out various kinds of setting of the digital camera 100. The display monitor 220 can be configured by a liquid-crystal display device or an organic EL display device.

The gyro sensor 250 is a sensor for detecting a vibration (movement) of the digital camera 100.

Figure 2:
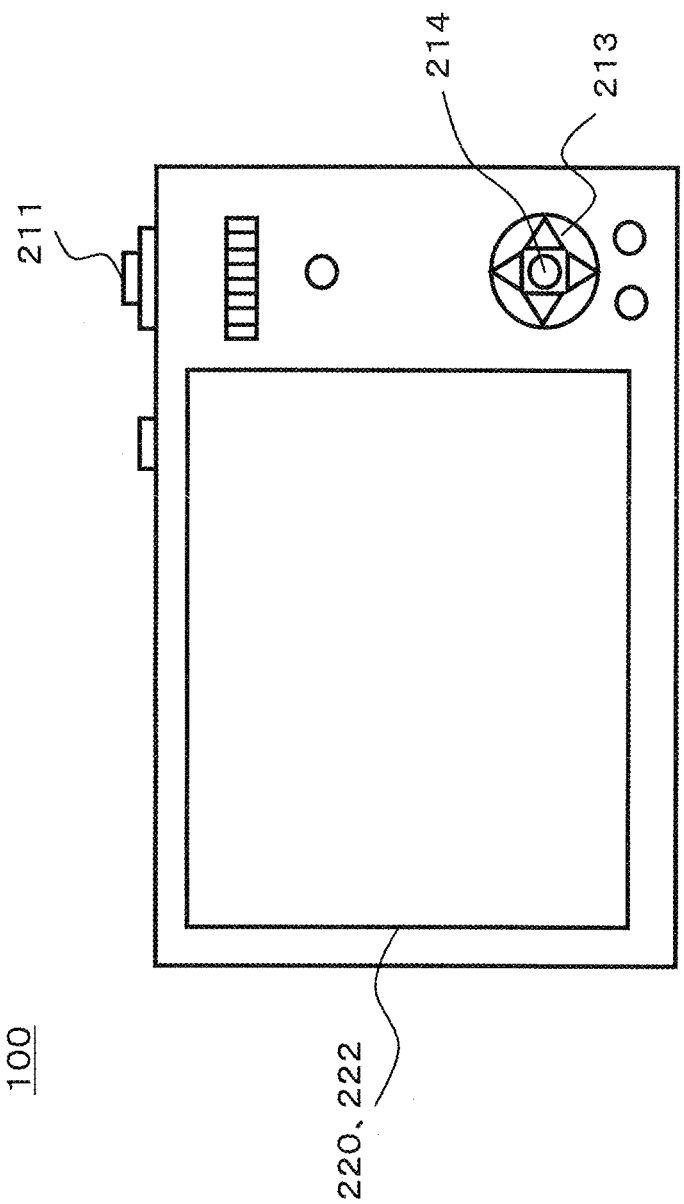
FIG. 2 is a back view of the digital camera.

FIG. 2 is a diagram showing a back surface of the digital camera 100. FIG. 2 shows a release button 211, selection buttons 213, a SET button 214, and a touch panel 222, as an example of the operation member 210. The operation member 210 receives an operation by the user to send various kinds of instruction signals to the controller 180.

The release button 211 is a two-step press type press button. When the release button 211 is half pressed by the user, the controller 180 performs autofocus control (AF control), auto-exposure control (AE control), or the like. When the release button 211 is fully pressed by the user, the controller 180 records, as a recorded image, image data of an image captured at a timing of operation of fully pressing, in the memory card 200 or the like.

The selection buttons 213 are press-type buttons provided in vertical and lateral directions. By pressing any one of the selection buttons 213 in the vertical and lateral directions, the user can move the cursor and select various kinds of condition items displayed on the display monitor 220.

The SET button 214 is a press-type button. When the user presses the SET button 214 when the digital camera 100 is in a shooting mode or a playback mode, the controller 180 displays a menu screen on the display monitor 220. The menu screen is a screen for setting various kinds of conditions for shooting/playback. When the SET button 214 is pressed while setting items of various kinds of conditions are selected, the controller 180 fixes setting of the selected items.

The touch panel 222 is disposed in superposition with a display screen of the display monitor 220, and detects a touch operation of a user finger on the display screen. With the touch panel 222, the user can perform an operation such as specifying an area of an image displayed on the display monitor 220.

2. Operation

2.1 Focus Selection Function

The digital camera 100 according to the present embodiment has a focus selection function for recording one image which is selected by the user from among images of a plurality of frame images which are simultaneously shot with mutually different focus positions. This function enables the user to select a focus position after the shooting of image. ON (active)/OFF (inactive) of the focus selection function can be set on a menu by user's operation.

According to the focus selection function, a moving image is shot (captured) while changing a focus position, and one image selected by the user is recorded from among images of a plurality of frames composing the shot moving image. In the focus selection function, a high resolution 4k moving image with around 4000×2000 pixels is recorded. One frame image selected based on instruction by the user is extracted from the 4k moving image to obtain a still image. Since the still image obtained in this way is extracted from the 4k moving image, it has high image quality.

Figure 3B:
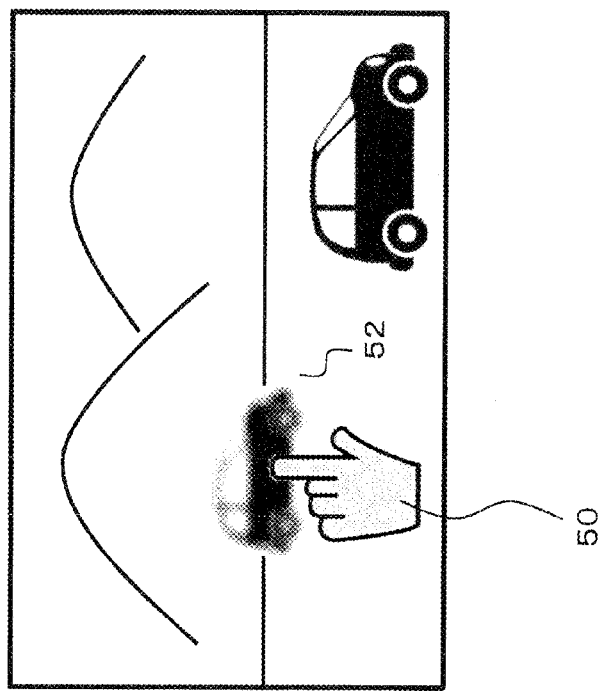
FIG. 3B is an explanatory view of specifying of a focus area by a user in an image.
Figure 3A:
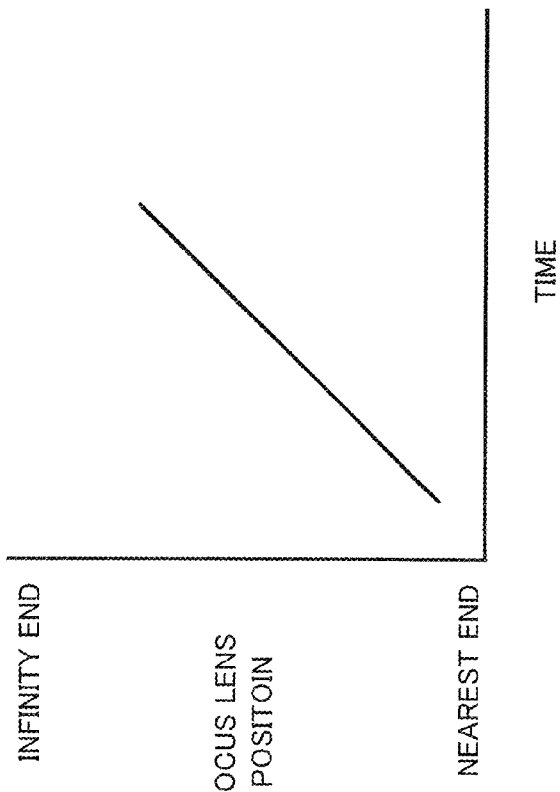
FIG. 3A is an explanatory view of movement of a focus lens in a focus selection function.
Figure 4:
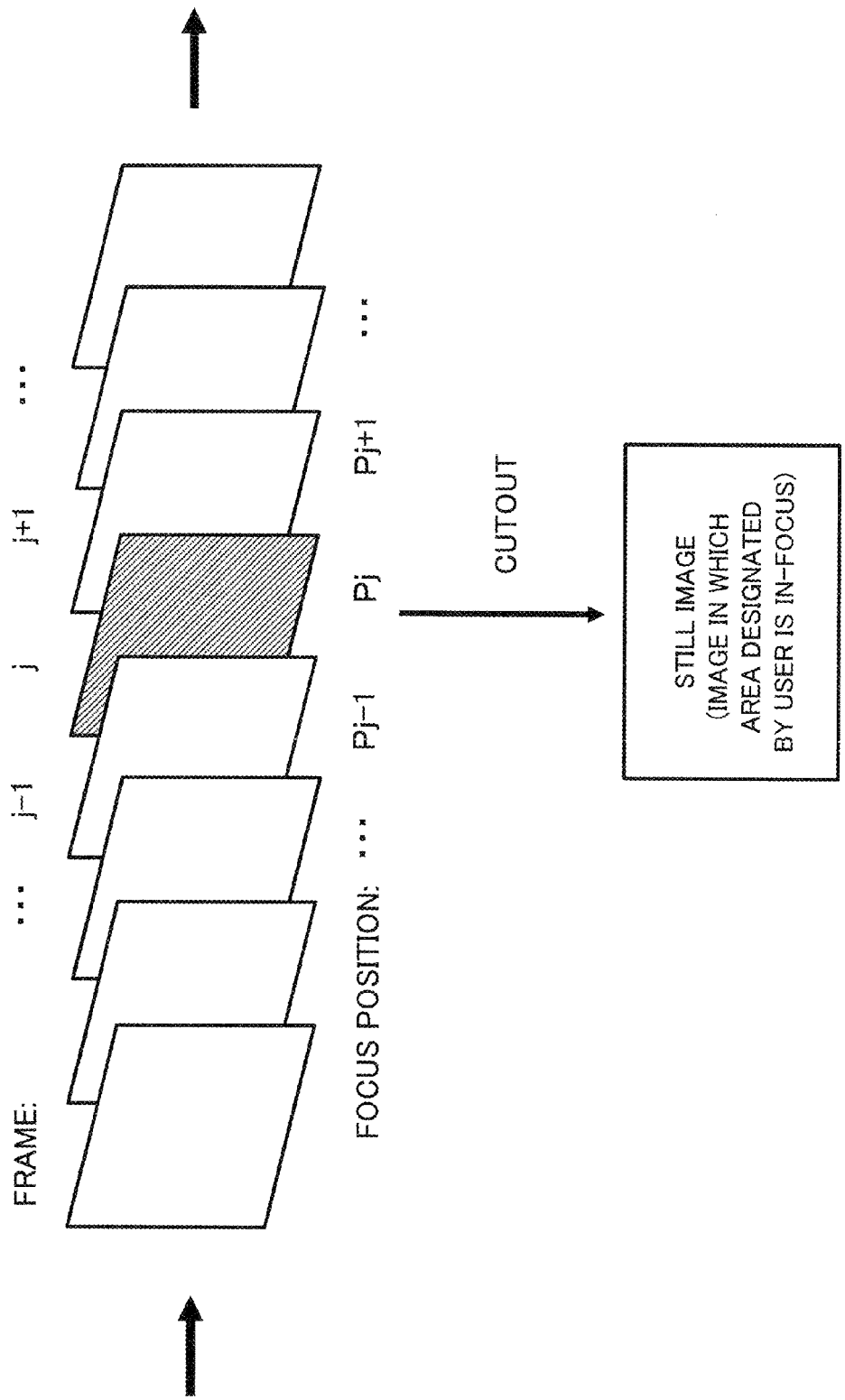
FIG. 4 is an explanatory view of extraction of a still image from moving image data.

Specifically, in the focus selection function, recording of moving image is carried out while moving the focus lens 111 from a nearest end side toward an infinity end side (and conversely), that is, while changing a focus position, as shown in FIG. 3A. Thereafter, as shown in FIG. 3B, a user 50 specifies a subject 52 (that is, an area) that user wants to focus on in the shot image, by touching it. As shown in FIG. 4, the digital camera 100 selects and extracts one frame image based on instruction by the user, from among a plurality of frame images composing the moving image, and records the extracted frame image as a still image. Accordingly, a high image-quality still image which is focused on a subject (an area) specified by the user can be obtained.

In the digital camera 100 according to the present embodiment, for an autofocus operation, a plurality (7 row×7 columns=49) of AF areas as shown in FIG. 5A are set in an image region 400. Then, for each AF area, a frame (hereinafter, referred to as "in-focus frame") that is focused on the AF area is obtained from among a plurality of frames composing the moving image. Information regarding the obtained in-focus frame is recorded in a focus information table. The digital camera 100 performs a focus search operation which detects in-focus frames each focused on each of AF areas and generates the focus information table, before recording (shooting) a moving image in the focus selection operation.

Figure 6B:
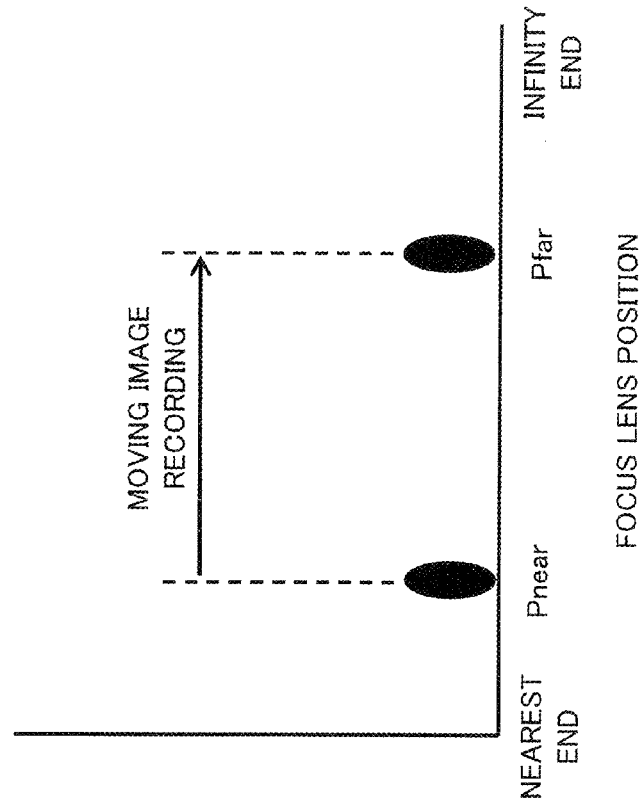
FIG. 6B is an explanatory view of a moving range of a focus lens at a focus search time.

FIG. 6A is a diagram showing a data structure of the focus information table. The focus information table 60 includes information indicating a driving range of the focus lens 111 in the moving image recording operation. Specifically, the focus information table 60 contains information (a nearest focus lens position) indicating a focus lens position (Pnear) closest to a nearest end, and information (a farthest focus lens position) indicating a focus lens position (Pfar) closest to an infinity end (refer to FIG. 6B), as the information indicating the drive range of the focus lens 111. Further, the focus information table 60 manages, in each AF area, a focus position in each AF area (a position of the focus lens 111 when a subject image is focused in each AF area) and a frame number of a frame focused in each AF area, relating with each other.

For example, a contrast value is obtained in each AF area while moving the focus lens 111. At this time, regarding a 19th AF area 41 shown in FIG. 5A, when a peak of a contrast value is detected at a focus lens position P as shown in FIG. 5B, a frame (a 50th frame, in this example) shot at the focus lens position P is selected as an in-focus frame in the 19-th AF area 41. Then, in the focus information table 60, for the 19th AF area, "50" is recorded as a frame number of the in-focus frame, and "P" is recorded as a position of the focus lens 111. The focus information table 60 is stored in a header of the moving image data which is obtained by moving image recording, for example.

Figure 7:
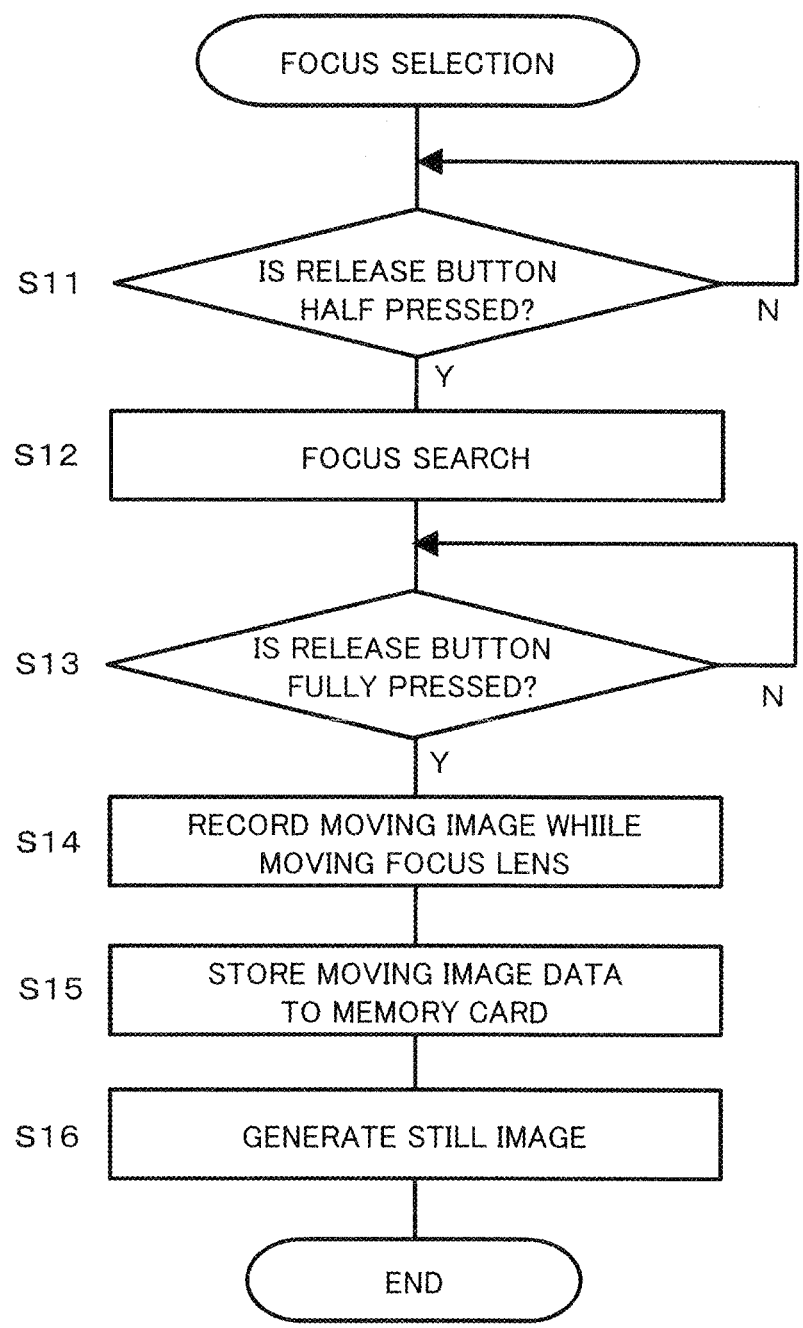
FIG. 7 is a flowchart showing a focus selection operation.

The focus selection operation of the digital camera 100 will be described with reference to a flowchart of FIG. 7.

When the release button 211 is half pressed by a user (YES in S11) in a state that the focus selection function is set active in advance in the digital camera 100, the controller 180 performs the focus search for creating the focus information table 60 by detecting a focus position in each AF area of an image (S12).

In the focus search, the controller 180 detects a contrast value in each AF area while moving the focus lens 111 from a nearest end to an infinity end (and conversely) (refer to FIGS. 5A and 5B).

The controller 180 creates the focus information table 60 based on detected contrast values. Specifically the controller 180 obtains, for each AF area, a position of the focus lens 111 which provides a maximum contrast value among a plurality of images (refer to FIG. 5B), while the focus lens 111 is being moved from the nearest end to the infinity end. Then the controller 180 records the position of the focus lens 111 in the focus information table 60 (refer to "c" in FIG. 6A). As to a certain AF area, when a contrast value for the certain area is lower than a predetermined threshold for all images, a focus position is not decided for the certain AF area, and thus a predetermined value indicating that a focus position for the certain AF area is unknown is recorded in the focus information table 60.

Further the controller 180 records, in the focus information table 60, the focus position (Pnear) closest to the nearest end and the focus position (Pfar) closest to the infinity end among the focus positions obtained by moving the focus lens 111 from the nearest end to the infinity end (refer to "a" in FIG. 6A). Then, the focus search ends. In this state, the focus information table 60 does not contain the information of frame number yet.

Thereafter, when the release button 211 is fully pressed by the user (YES in S13), an image recording operation for recording a moving image is started.

Figure 6C:
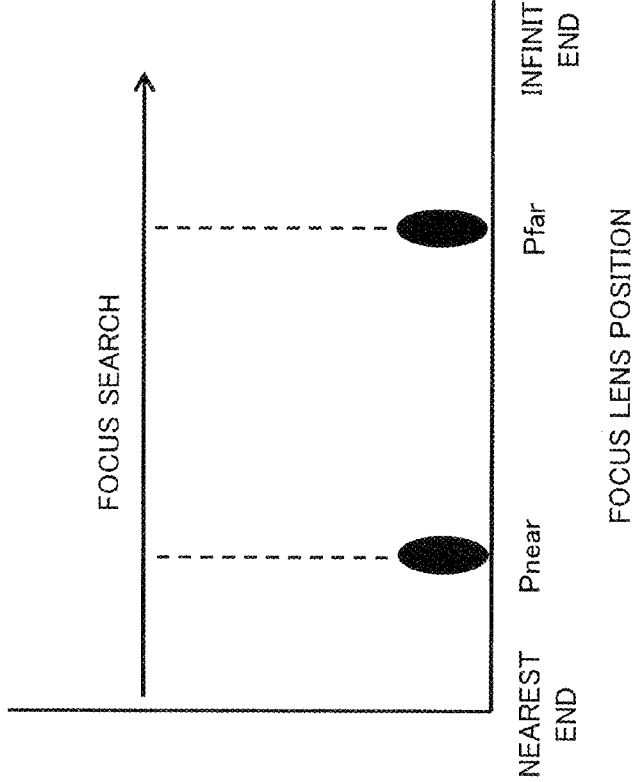
FIG. 6C is an explanatory view of a moving range of a focus lens at a moving-image recording time.

That is, the controller 180 returns the focus lens 111 to the nearest end, and performs a moving image recording while moving the focus lens 111 in a predetermined range (S14). The predetermined range is a range from a focus position (Pnear) of the focus lens 111 closest to the nearest end to a focus position (Pfar) of the focus lens 111 closest to the infinity end, as shown in FIG. 6C. The controller 180 determines the predetermined range by referring to the focus information table 60. By limiting the moving range of the focus lens 111 to such a predetermined range, time taken for the moving image recording can be shortened as compared with a case of moving the focus lens 111 in a whole range of the movable range. The moving image recording is performed in accordance with a predetermined format for the moving image data. For example, a moving image is recorded in accordance with MP4 standard (H.264/MPEG-4 AVC system). During the moving image recording, an icon or a message indicating that the moving image recording is in progress, for example, may be displayed on the display monitor 220.

Further, during the moving-image recording, the controller 180 relates a position of the focus lens 111 to a frame number of each frame composing the moving image. Hence, a frame number is related to the corresponding AF area in the focus information table 60 (refer to "b" in FIG. 6A).

Figure 8:
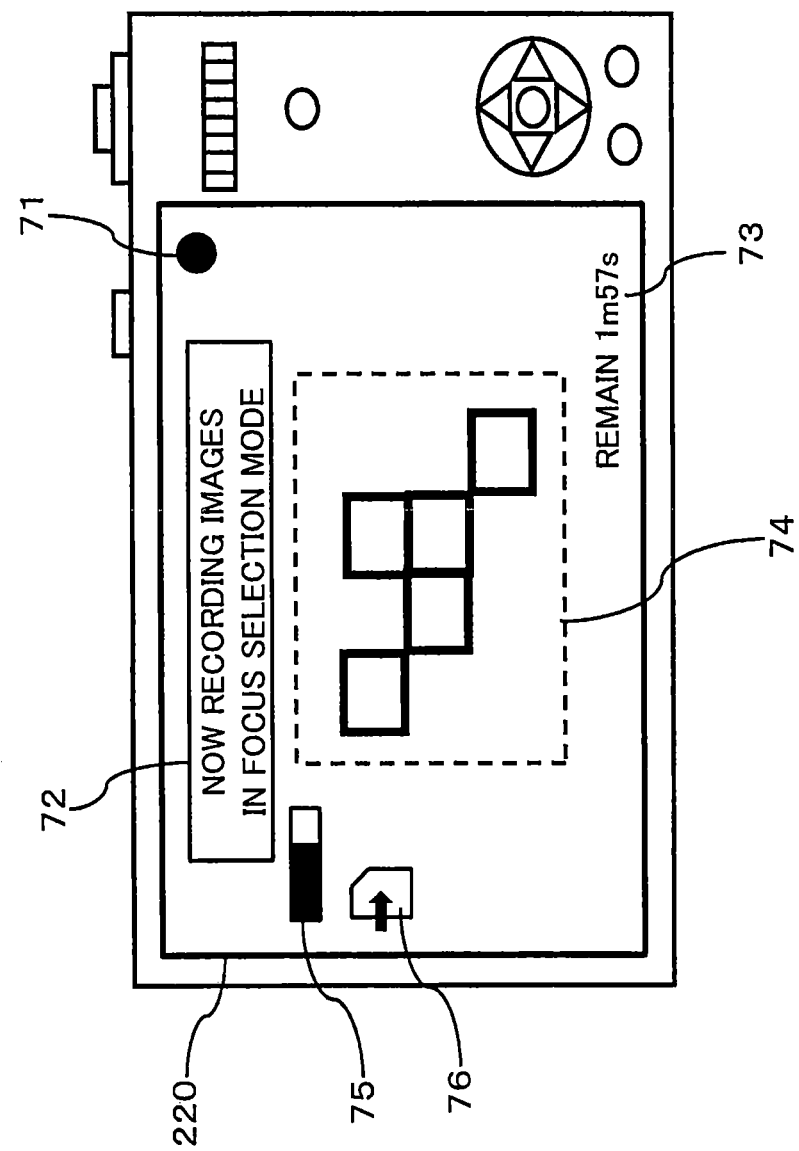
FIG. 8 is a diagram showing icons displayed during image shooting by focus selection.

During the moving-image recording, various kinds of icons as shown in FIG. 8 are displayed on the display monitor 220, superimposed on the image that is being recorded. For example, the display monitor 220 displays an icon 71 indicating that moving-image recording is in progress, a message 72 indicating that image is shot by the focus selection function, information 73 indicating remaining time of the moving image recording, and a progress bar 75 indicating a progress state of the moving image recording. Further, the display monitor 220 displays a frame 74 indicating an in-focus AF area, and an icon 76 indicating that a moving image is being recorded in the memory card 200. By referring to these pieces of information, the user can understand that a shooting operation by focus selection is in progress, and understand a state of progress of the shooting operation.

Referring back to FIG. 7, when the moving image recording ends, the moving image data including the focus information table 60 recorded in the header thereof is recorded in the memory card 200 (S15). Hence, the image shooting operation ends.

After ending the image shooting operation, processing of generating a still image is performed following the instruction of the user (S16). Specifically, a still image which is focused on a subject or an area of an image specified by the user is generated (extracted) from a moving image recorded in the image shooting operation. The still-image generation processing will be described in detail below.

Figure 9:
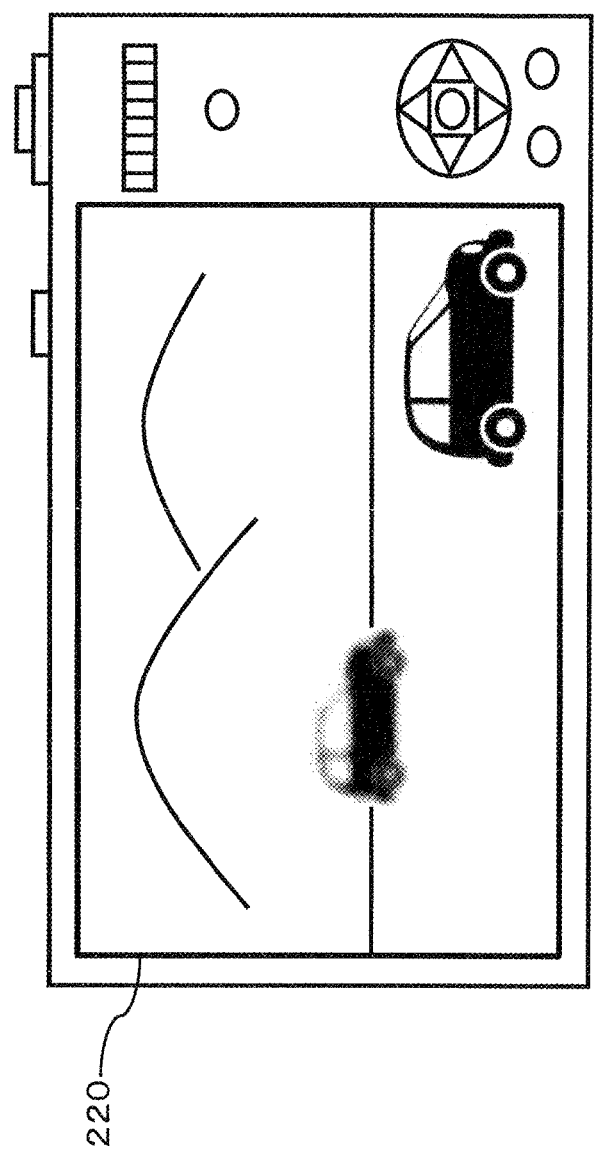
FIG. 9 is a diagram showing a screen (a focus area assignment screen) which is displayed immediately after an end of moving-image data recording.

After ending the image shooting operation, the controller 180 displays, on the display monitor 220, a frame image in the moving image which is recorded immediately before. For example, as shown in FIG. 9, one frame image in the moving image recorded immediately before is displayed on the display monitor 220. At this time, for example, a frame image (a still image) which is recorded first or recorded last in a plurality of frame images composing the recorded moving image may be displayed.

The user operates the touch panel 222 provided on the camera back surface to specify a subject (that is, an area) which is desired to be focused on the displayed image. For example, as shown in FIG. 10A, by touching the subject 52 (that is, an area of the subject 52), the user 50 specifies the subject 52 as a target (an area) which is desired to be focused.

When a subject (that is, an area) is specified by the user, the controller 180 identifies, by referring to the focus information table 60, an in-focus frame regarding an AF area which corresponds to the area of the subject specified by the user. For example, when the subject 52 is specified by the user as shown in FIG. 10A, the controller 180 identifies an AF area 42 corresponding to the subject 52, as shown in FIG. 10B, and obtains, by referring to the focus information table 60, a frame number of an in-focus frame regarding the identified AF area 42.

Then, the controller 180 displays a frame image of the obtained frame number on the display monitor 220. For example, when the subject 52 is specified by the user in the image shown in FIG. 10A, an image which is focused on the specified subject 52 is displayed, as shown in FIG. 10C.

When the image displayed on the display monitor 220 is a desired image, the user can finally set this image as a still image to be recorded, by pressing the SET button 214. On the other hand, when the image displayed on the display monitor 220 is not a desired image, the user can change an image to be displayed on the display monitor 220, by operating the selection buttons 213 or the focus ring.

When the SET button 214 is pressed by the user, a currently displayed image (a frame image) is extracted as a still image, and is recorded in the memory card 200. The still image data may be recorded in the internal memory 240 or other recording medium, in place of or in addition to the memory card 200.

The moving image data is recorded by the moving-image format (MP4), and is subjected to intra-frame compression. Therefore, when extracting, as a still image, one frame of the moving image data, the controller 180 converts a format of data of a frame image into a format for a still image (for example, JPEG), and records the data.

By the aforementioned focus selection function, the user can obtain a still image which is focused on a desired subject or area, after image shooting. In other words, the user can select a focus position after image shooting.

2.2 Message Display

By the above focus selection function, focus search is performed to prepare the focus information table 60. Thereafter, moving-image recording is performed. Therefore, the focus search and the moving-image recording need to be performed under the same shooting conditions (an angle of view, a visual field, a focus position, and the like). That is, after the focus search, when the user performs an operation of changing a focus position on a subject, for example, an operation of changing an angle of view like a zoom operation, and an operation of changing a visual field, such as an operation of changing a camera direction (for example, a pan operation, and shake of the camera), a focus position is changed against a status indicated by the focus information table 60 which is generated by the focus search before such a user operation. Therefore, when a still image is generated from the recorded moving image by referring to the focus information table 60 generated before such a user operation, an image which is focused on a user-desired subject, that is, a user-desired area could not be obtained in some cases.

Accordingly, in the present embodiment, as shown in FIG. 11A, during a period from an end of the focus search to an end of the moving image recording, an operation of changing a focus position is prohibited. Therefore, during performing of the focus selection, when the user performs an operation of changing a focus position during a period from an end of the focus search to an end of the moving image recording (that is, when the content of the focus information table 60 does not match the current state), recording of a moving image for the focus selection function is prohibited or stopped. Further, a warning message indicating that the focus selection function cannot be performed continuously is displayed on the display monitor 220 to notify the user of the message. Accordingly, generation of a still image which is out of focus in the focus selection function is prevented.

Figure 12:
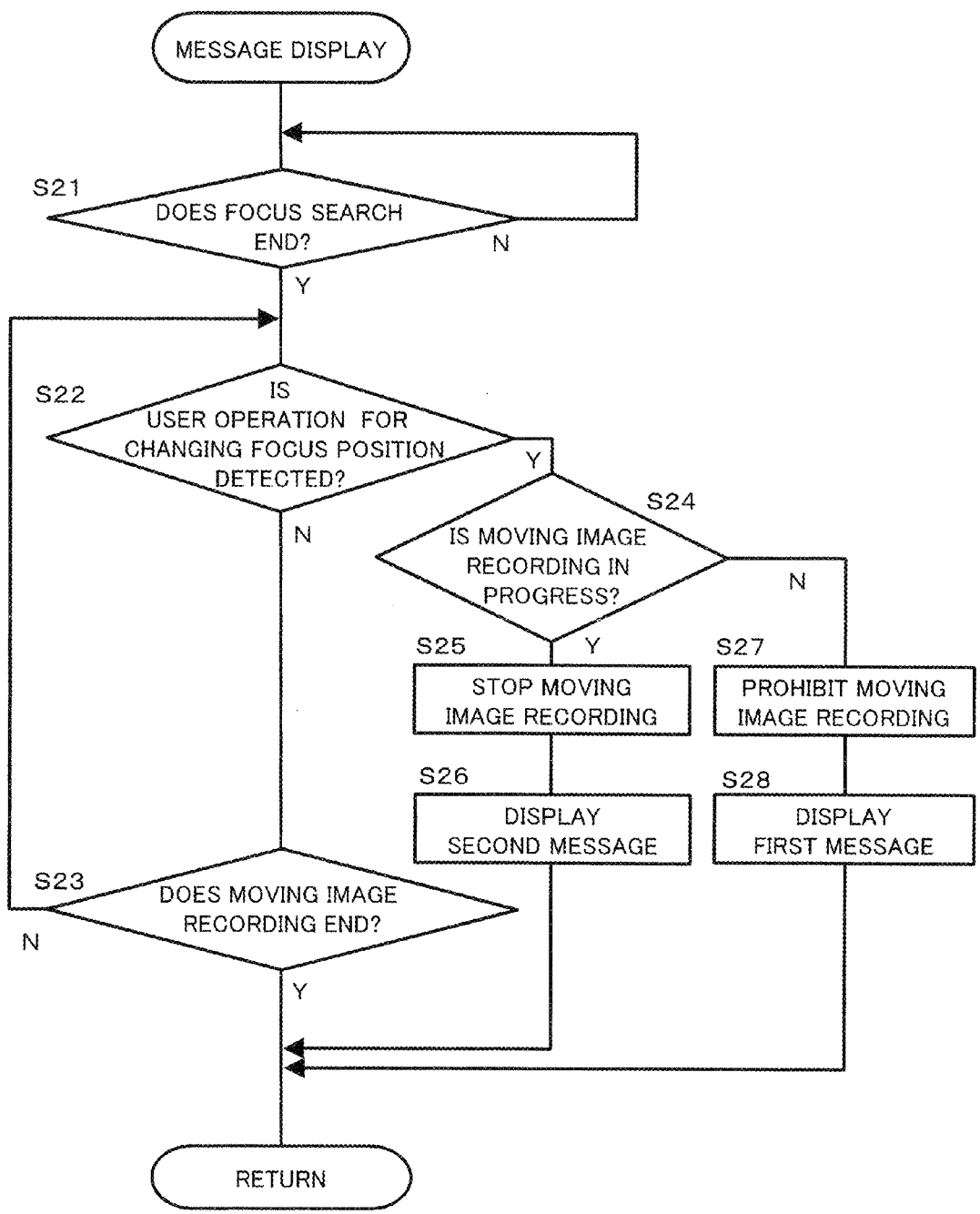
FIG. 12 is a flowchart showing a message display operation.

Processing of displaying a warning message during the focus selection will be described with reference to a flowchart in FIG. 12. The following processing is performed by the controller 180 during the focus selection.

The controller 180 determines whether the focus search ends (S21). When the focus search ends (YES in S21), the controller 180 determines whether the user performs an operation of changing a focus position on a subject (S22). In this case, the operation of changing a focus position on a subject includes a zoom operation (an operation of changing an angle of view), a pan operation and a tilt operation of changing a posture of a camera. The pan operation and tilt operation can be detected by a gyro sensor which is mounted on the digital camera 100. When a focus lens is a lens of which movable range can be changed in an autofocus operation, the operation of changing a focus position includes an operation of changing setting of the movable range of the focus lens.

When a user operation of changing a focus position is not detected (NO in S22), the controller 180 continues a recording operation of a moving image.

On the other hand, when it is detected that a user operation of changing a focus position on a subject is performed (NO in S22), the controller 180 determines whether a recording of a moving image is being performed (S24). When the moving image recording is not being performed (NO in S24), that is, when the moving image recording is not started yet, the controller 180 prohibits the recording operation of the moving image (S27) and also displays a first message on the display monitor 220 (S28). When the moving image recording is being performed (YES in S24), the controller 180 stops the recording operation of the moving image (S25) and also displays a second message on the display monitor 220 (S26).

FIGS. 11B and 11C are diagrams showing examples of the first and second messages displayed on the display monitor 220. When a user operation of changing a focus position is detected during a period from an end of the focus search to a start of the moving image recording, a first message 70a as shown in FIG. 11B, for example, is displayed. After an end of the focus search, when a user operation of changing a focus position is detected during the moving image recording, a second message 70b as shown in FIG. 11C, for example, is displayed. Displaying these messages can make the user recognize that it is necessary to redo the focus search. The contents of the messages shown in FIGS. 11B and 11C are examples.

3. Effects and Others

The digital camera 100 (an example of an imaging apparatus) according to the present embodiment has a focus selection function (an example of an image selection function) capable of selecting an image shot at a user-desired focus distance from among continuously shot images at a plurality of focus distances. The digital camera 100 includes the optical system 110 that includes the focus lens 111, the operation member 210 (an example of an operating unit) that receives a user operation, the CCD 140 (an example of an imaging unit) that generates an image signal from optical information which is input via the optical system, the image processor 160 that performs predetermined processing to an image signal generated by the CCD 140 and generates image data, the display monitor 220 (an example of a display unit) that displays predetermined information, and the controller 180 (an example of a control unit) that controls the CCD 140 and/or the image processor 160.

A plurality of AF areas are set in a region of an image indicated by the image data. In the focus selection function, the controller 180 performs the focus search processing (an example of search processing) for generating frame images while moving the focus lens 111 and determining a frame image which is focused on each of the AF areas (S12). After an end of the focus search processing, the controller 180 performs moving image shooting processing for recording a moving image while moving the focus lens 111 (S14-S15). After the moving image shooting processing, the controller 180 refers to a result of the focus search processing (the focus information table 60), and performs still image generation processing for generating a still image from a plurality of frame images composing the recorded moving image data (S16). Specifically, the controller 180 extracts, as a still image, a frame image which is focused on an AF area corresponding to an area of the image specified by the user, from among a plurality of frame images composing the recorded moving image data. When the user performs an operation of changing a focus position on a subject during a period from an end of the focus search processing to an end of moving-image shooting processing, the controller 180 displays a message (70a, 70b) that calls user's attention on the display monitor 220 (S24-S28).

As described above, when an operation of changing a focus position on a subject such as a zoom operation and a pan operation is performed in the focus selection function, the digital camera 100 according to the present embodiment displays a message that calls user's attention to a fact that the focus selection function cannot be realized continuously on the display monitor 220 (refer to FIGS. 11B and 11C). Accordingly, the user can recognize the necessity of performing the focus search again and the stop of the moving image shooting for the focus selection, and can recognize that it is necessary to redo the operation for realizing the focus selection function.

Other Embodiments

The first embodiment is described above as exemplification of a technique disclosed in the present application. However, the technique in the present disclosure can be also applied to embodiments in which change, replacement, addition, and omission are appropriately carried out, in addition to the first embodiment. Further, a new embodiment can be also provided by combining constituent elements described in the first embodiment. Other embodiments will be exemplified below.

(1) In the above embodiment, the focus information table 60 stores the focus position (Pnear) which is closest to the nearest end and the focus position (Pfar) which is closest to the infinity end. However, these focus positions (Pnear, Pfar) are not necessarily to be stored in the focus information table 60, and may be stored in other than the focus information table 60.

(2) In the above embodiment, the focus information table 60 stores, for each area of an image, information (frame number) which indicates a frame focused on the area (in-focus frame). However, the focus information table 60 is not limited to this configuration. The focus information table may store, for each area of an image, a position of the focus lens 111 that is focused on the area. In this case, a second table that indicates a relationship between a focus lens position and each frame may be generated in the moving image recording operation. In extracting the still image, a frame image to be extracted from a moving image can be identified by referring to the focus information table and the second table.

(3) The above embodiment describes the focus selection function for generating a still image which is focused on a user-desired image area from moving image data. The above-described display control of a message can be also applied to an imaging apparatus having a function other than the focus selection function. That is, the above display control of a message is effective for an imaging apparatus that performs the focus search and the moving image recording and performs a function of generating a still image using a frame image composing a recorded moving image, by referring to a result of the focus search. In the case of performing the above function, when the user performs an operation of changing a focus position on a subject between the focus search and the moving image recording, a result of the focus search becomes not correct. Therefore, by displaying the above message, it becomes possible to make the user recognize the necessity of redoing the focus search and the like. Such a function includes depth synthesizing (focus synthesizing), for example. The depth synthesizing (focus synthesizing) is processing of generating a still image having a pseudo deep depth of field by synthesizing images (still images, or frame images of moving images) that are recorded at plurality of focus distances. The imaging apparatus in this case performs focus search and moving image recording in a similar manner to that in the above embodiment, and thereafter, decides images to be used for depth synthesizing from among frame images composing a moving image, and performs depth synthesizing processing by using the decided images.

(4) In the above embodiment, the digital camera 100 (an example an imaging apparatus) records a moving image while moving a position of the focus lens. Instead of recording a moving image while moving a position of the focus lens, the digital camera 100 may continuously record still images while moving a position of the focus lens (a continuous shooting function). In this case, the digital camera 100 may extract (generate) a user-desired still image from among a plurality of still images that are recorded continuously.

(5) In the above embodiment, contrast AF is used as an auto-focusing system. Alternatively, phase difference AF may be also used.

(6) The focus selection function disclosed in the above embodiment can be applied to both kinds of digital cameras of an interchangeable lens camera and a lens-integrated type camera.

(7) In the above embodiment, the imaging apparatus is described by using a digital camera as an example. However, the imaging apparatus is not limited to a digital camera. The idea of the present disclosure can be applied to various types of imaging apparatuses that can perform shooting of a moving image, such as a digital video camera, a smartphone, and a wearable camera.

(8) In the above embodiment, the imaging unit is configured by a CCD. However, the imaging unit is not limited to a CCD. The imaging unit may be also configured by an NMOS image sensor or a CMOS image sensor.

The embodiment is described above as exemplification of the technique in the present disclosure. For this purpose, the appended drawings and the detailed description are provided. Therefore, the constituent elements described in the appended drawings and the detailed description also include, not only constituent elements which are necessary to solve the problems, but also constituent elements which are not essential to solve the problems, to exemplify the above technique. Accordingly, because of the not essential constituent elements being described in the appended drawings and the detailed description, these not essential constituent elements should not be admitted as essential. Further, because the above embodiment is for exemplifying the technique in the present disclosure, various kinds of change, replacement, addition, and omission can be carried out in claims or in an equivalent range of the claims.

INDUSTRIAL APPLICABILITY

The present disclosure can be applied to imaging apparatuses that can shoot a moving image (or continuous still images). Specifically, the present disclosure can be applied to various types of imaging apparatuses that can shoot a moving image (or continuous still images), such as a digital video camera, a smartphone, a wearable camera.

What is claimed is:

1. An imaging apparatus that continuously shoots a plurality of images while changing a focus distance and generates one still image from among the plurality of shot images, the imaging apparatus comprising:
    an operating unit configured to receive a user operation;
    an imaging unit configured to generate an image signal from optical information which is input via the optical system including a focus lens;
    an image processor configured to perform predetermined processing to the image signal generated by the imaging unit to generate image data;
    a display unit configured to display predetermined information; and
    a control unit configured to control the imaging unit and/or the image processor, wherein
    a plurality of AF areas are set in a region of an image indicated by the image data,
    the control unit
        performs search processing for shooting frame images while moving the focus lens and obtaining a frame image which is focused on each AF area,
        performs, after ending the search processing, moving image shooting processing for recording a moving image while moving the focus lens, and
        performs, after the moving image shooting processing, still image generation processing for generating a still image from among a plurality of frame images composing the recorded moving image data, by referring to a result of the search processing, and
    when a user performs an operation of changing a focus position on a subject during a period from an end of the search processing to an end of the moving-image shooting processing, the control unit performs an action that calls user's attention.

2. The imaging apparatus according to claim 1, wherein the operation of changing the focus position includes a zoom operation, an operation of changing a posture of the imaging apparatus, and/or an operation of changing a movable range of the focus lens in an autofocus operation.

3. The imaging apparatus according to claim 1, wherein when the user performs the operation of changing the focus position during the moving image shooting processing, the control unit stops the moving-image shooting processing.

4. The imaging apparatus according to claim 1, wherein when the user performs the operation of changing the focus position before starting the moving image shooting processing after ending the search processing, the control unit prohibits performing the moving image shooting processing.

5. The imaging apparatus according to claim 1, wherein when the user performs the operation of changing the focus position during a period from an end of the search processing to a start of the moving image shooting processing, the control unit displays a first message, and when the user performs an operation of changing a focus position during the moving image shooting processing after an end of the search processing, the control unit displays a second message different from the first message.

6. The imaging apparatus according to claim 1, wherein the control unit
- generates a table for managing each of AF areas of image data and information indicating the frame image focused on the corresponding AF area, in the search processing, and
- extracts a still image by referring to the table, in the still image generation processing.

7. The imaging apparatus according to claim 1, wherein, the control unit extracts, from among a plurality of frame images composing the recorded moving image data, one frame image, as the still image, which is focused on an AF area corresponding to an area on an image specified by the user.

8. The imaging apparatus according to claim 1, wherein
- the operating unit includes a release button, and
- the control unit starts the search processing when a half-press operation of the release button is performed, and thereafter starts the moving image shooting processing when a full press operation of the release button is carried out.

* * * * *